US008733587B2

(12) United States Patent
Lin

(10) Patent No.: US 8,733,587 B2
(45) Date of Patent: May 27, 2014

(54) AUTOMATIC PART FEEDER

(75) Inventor: Hou-Yao Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 243 days.

(21) Appl. No.: 13/083,608

(22) Filed: Apr. 11, 2011

(65) Prior Publication Data

US 2012/0189407 A1    Jul. 26, 2012

(30) Foreign Application Priority Data

Jan. 26, 2011 (TW) .............................. 100102778 A

(51) Int. Cl.
*B25J 11/00* (2006.01)
(52) U.S. Cl.
USPC ......................................... 221/279; 221/258
(58) Field of Classification Search
USPC .................................. 221/208, 247, 258, 279
See application file for complete search history.

(56) References Cited

U.S. PATENT DOCUMENTS 4,050,392 A * 9/1977 Taddicken .................... 112/113
6,264,062 B1 * 7/2001 Lack et al. .................... 221/267

* cited by examiner

*Primary Examiner* — Gene Crawford
*Assistant Examiner* — Kelvin L Randall, Jr.
(74) *Attorney, Agent, or Firm* — Novak Druce Connolly Bove + Quigg LLP

(57) ABSTRACT

An automatic part feeder includes a base, a rotatable disk covering the base, a part delivering devices, and a rotatable disk driving device received in the base. Each of the part delivering devices includes a ring-shaped receiving room opening toward a first end surface of the base, a first driving motor having a first rotatable shaft, and an ejector pole having one end extending through the ring-shaped receiving room and another end threadedly engaged with the first rotatable shaft. The rotatable disk driving device has a second driving motor having a second rotatable shaft. The rotatable disk includes receiving holes, and the second rotatable shaft engages with the rotatable disk and is configured for driving the rotatable disk to rotate to align the receiving holes with the respective ring-shaped receiving rooms to receive the parts ejected from the ring-shaped receiving rooms.

8 Claims, 4 Drawing Sheets

AUTOMATIC PART FEEDER

BACKGROUND

1. Technical Field

The present disclosure relates to automatic part feeders.

2. Description of Related Art

Automatic part feeders are widely used to feed parts in factory lines. The parts can be in many shapes according to need, for example, in a ring shape, in a C shape. Example workpieces for such ring-shaped or C-shaped parts are spacers, which are widely used in various products, such as lens modules. Such a spacer in a lens module can space two lenses, and can allow the light pass through the through hole of the spacer.

In mounting products, usually, the spacers are manually placed in a tray to be ready for the mounting of the product. However, manually feeding pars is inefficient.

What is needed, therefore, is an automatic part feeder, which can overcome the above shortcomings.

BRIEF DESCRIPTION OF THE DRAWINGS

Many aspects of the present automatic part feeder can be better understood with reference to the following drawings. The components in the drawings are not necessarily drawn to scale, the emphasis instead being placed upon clearly illustrating the principles of the automatic part feeder. Moreover, in the drawings, like reference numerals designate corresponding parts throughout the several views.

DETAILED DESCRIPTION

Embodiments of the present automatic part feeder will now be described in detail below and with reference to the drawings.

Figure 1:
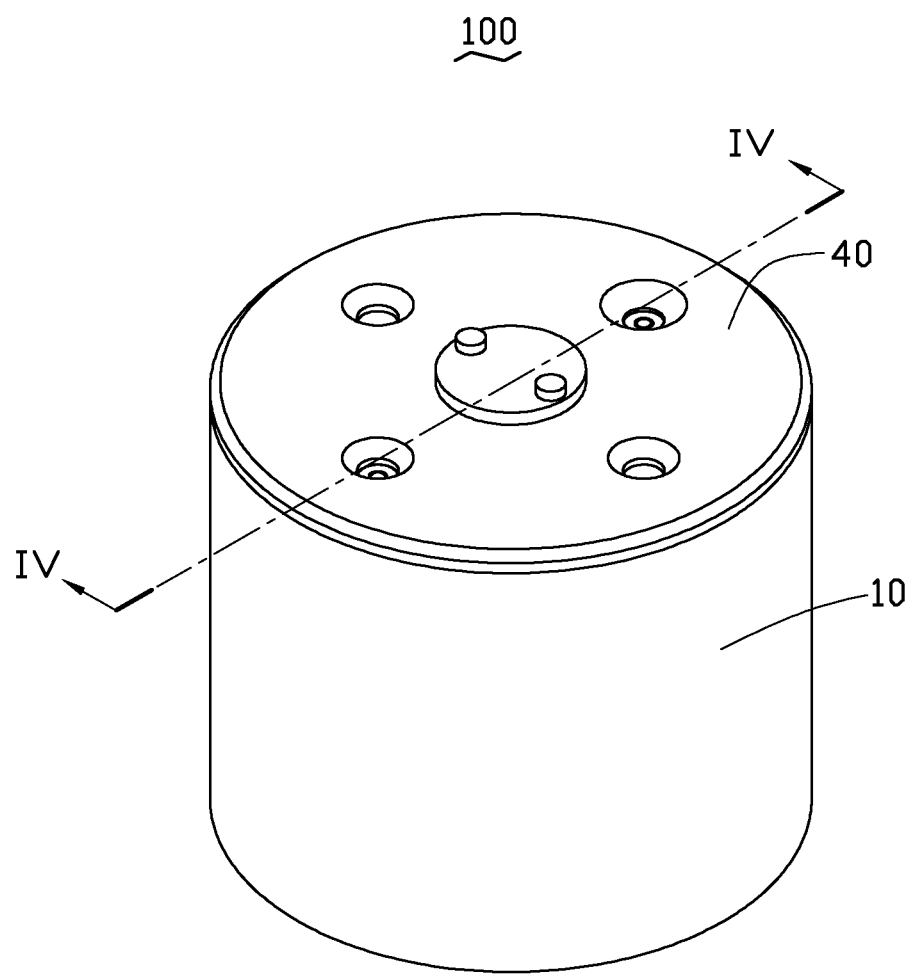
FIG. 1 is an isometric view of an automatic part feeder in accordance with one embodiment.
Figure 2:
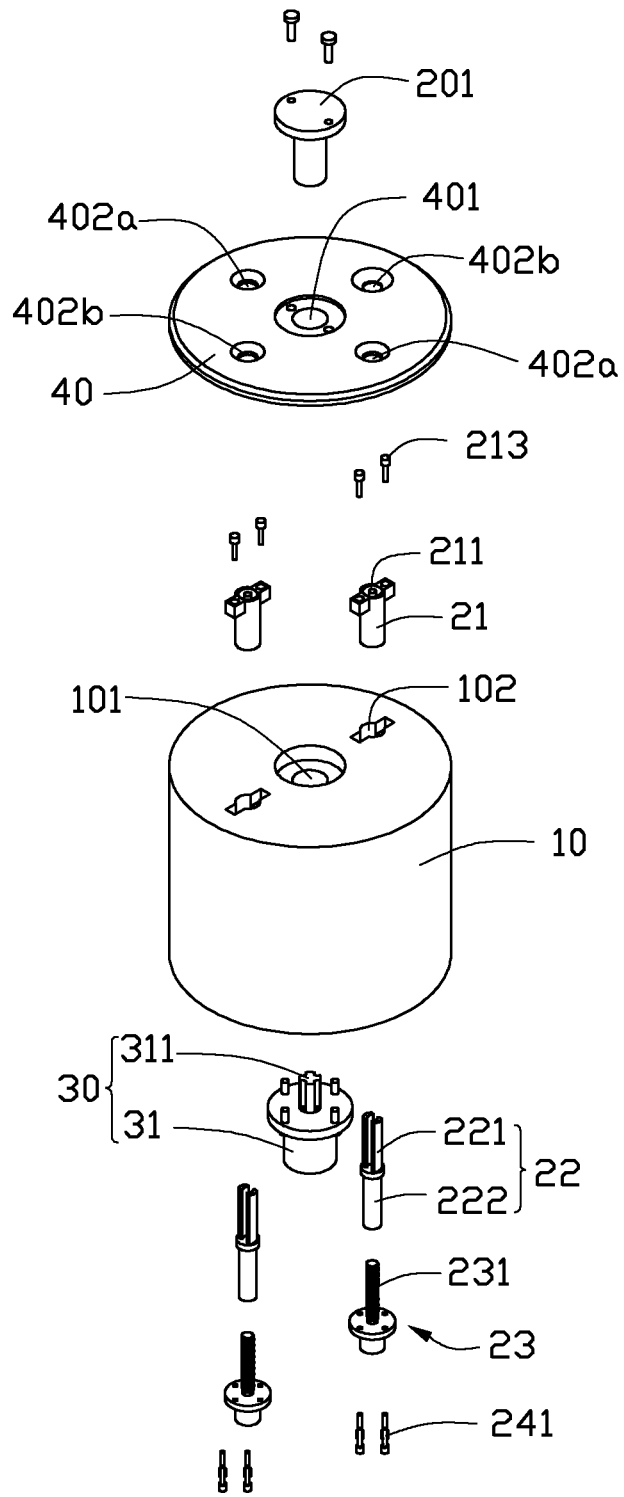
FIG. 2 is an exploded view of the automatic part feeder of FIG. 1, the automatic part feeder having a part delivering device.
Figure 3:
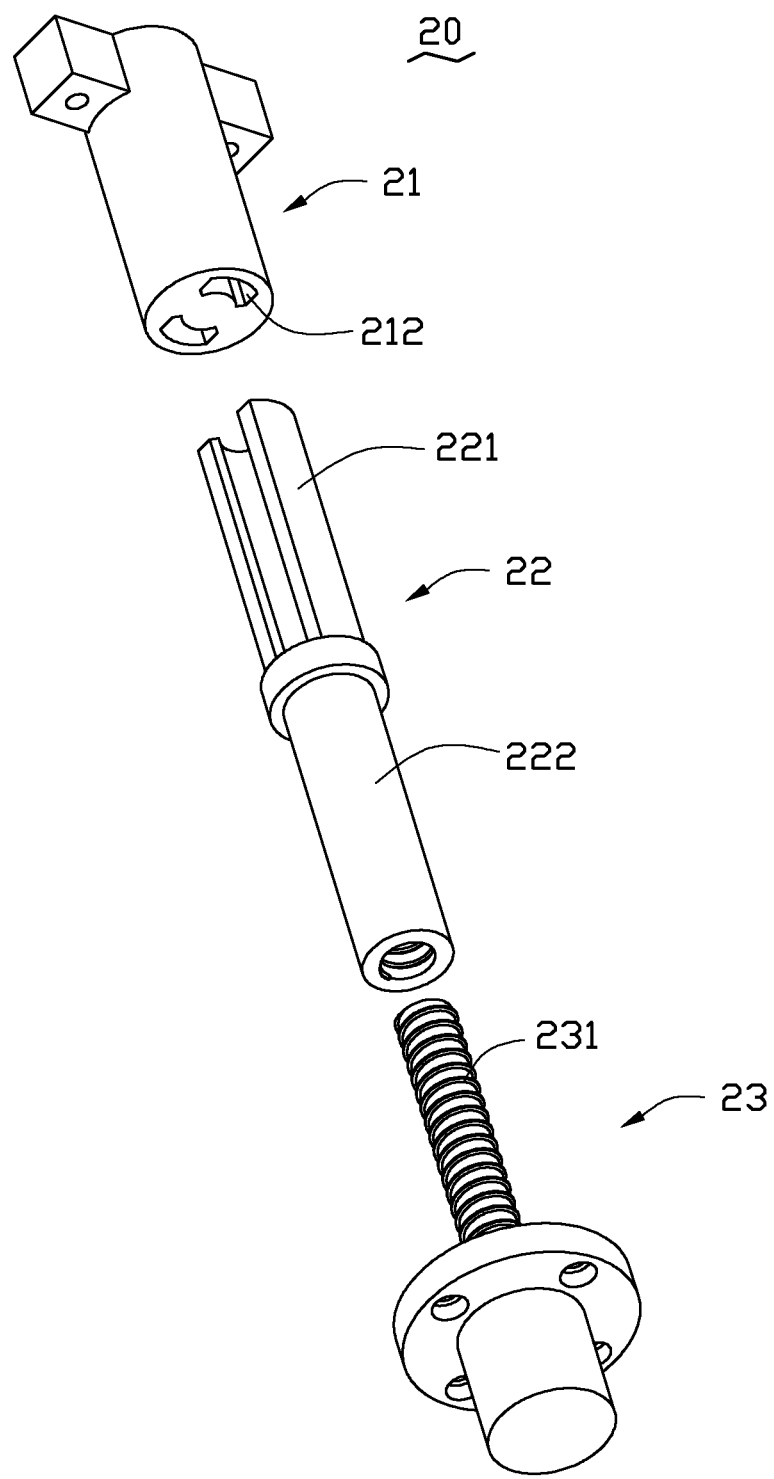
FIG. 3 is an enlarged view of the part delivering device shown in FIG. 2.
Figure 4:
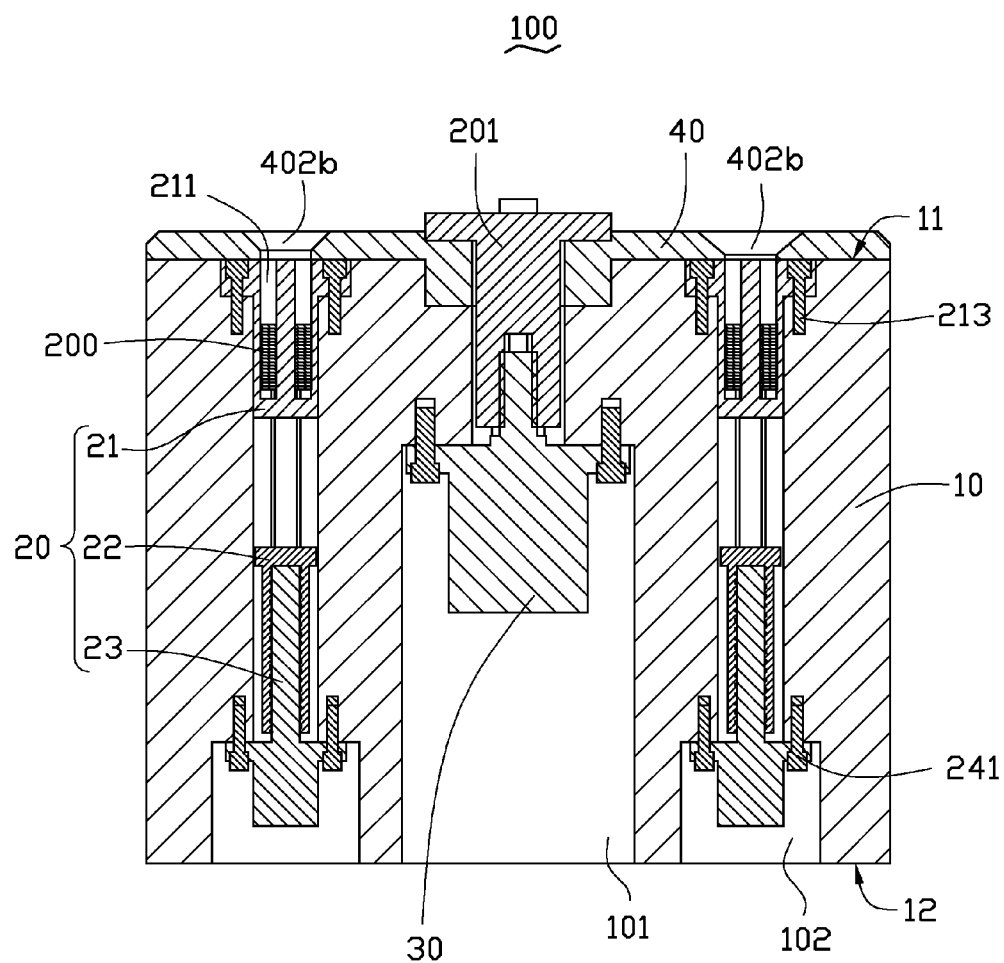
FIG. 4 is a cross-sectional view of the automatic part feeder of FIG. 1, taken along line IV-IV, with parts accommodated in the automatic part feeder.

Referring to FIGS. 1 to 4, an automatic part feeder 100 includes a base 10, two part delivering devices 20, a rotatable disk 40, and a rotatable disk driving device 30. The part delivering devices 20 and the rotatable disk driving device 30 are fixedly accommodated in the base 10, and the rotatable disk 40 is mounted at an end surface of the base 10.

The base 10 is substantially cylindrical, and has a first end surface 11 and an opposite second end surface 12 along a central axis of the base 10. The base 10 has a first accommodating hole 101 and two second accommodating holes 102. The second accommodating holes 102 are symmetrical about the first accommodating hole 101. In the present embodiment, each of the first and second accommodating holes 101, 102 are exposed at both of the first and second end surfaces 11, 12, the first accommodating hole 101 is located at a central part of the base 10, and a central axis of the first accommodating hole 101 is aligned with the central axis of the base 10.

The first accommodating hole 101 is used for accommodating the rotatable disk driving device 30, and each of the second accommodating holes 102 is used for accommodating one of the part delivering devices 20. In the present embodiment, each of the first and second accommodating holes 101, 102 is a stepped hole, and the rotatable disk driving device 30 and the part delivering devices 20 are fixed in the holes.

It is understood that, each of the first and second accommodating holes 101, 102 can be a blind hole, and the number of the second accommodating holes 102 can be varied according to need.

Each of the part delivering devices 20 includes a part support 21, an ejector pole 22 and a first driving motor 23. The part support 21 is received in the second accommodating hole 102, and fixed to the base 10 by two screws 213 and arranged near to the first end surface 11. The first driving motor 23 is arranged near to the second end surface 12 and is fixed to the base 10 by two screws 241. The ejector pole 22 extends through the part support 21 and is driven by the first driving motor 23.

The part support 21 has a ring-shaped receiving room 211 for receiving a plurality of parts 200. The parts 200 can be ring-shaped spacers, or other workpieces in a same shape or in a similar shape such as C shape or semi-circular shape. An open end of the ring-shaped receiving room 211 is flush with the first end surface 11. A bottom of the ring-shaped receiving room 211 has two curved sliding holes 212 formed through the ring-shaped receiving room 211.

The ejector pole 22 includes two ejector posts 221 and a hollow cylindrical portion 222. The ejector posts 221 each are curved and extend through the sliding holes 212 to abut on a bottom of the parts 200. The cylindrical portion 222 has an inner thread formed in the inner wall of the cylindrical portion 222.

The first driving motor 23 has an externally threaded first rotatable shaft 231. The first rotatable shaft 231 threadedly engages with the cylindrical portion 222, and rotates in a selected direction, thereby propelling the cylindrical portion 222 together with the entire ejector pole 22 to move towards the first end surface 11, and thus ejecting the parts 200 out of the ring-shaped receiving room 211 one by one.

The rotatable disk driving device 30 has a second driving motor 31, and the second driving motor 31 has an externally threaded second rotatable shaft 311. The second rotatable shaft 311 rotates in a selected direction.

The rotatable disk 40 covers the first end surface 11 of the base 10. The rotatable disk 40 has an engaging hole 401. In the present embodiment, the engaging hole 401 is coaxial with the rotatable disk 40.

The rotatable disk 40 has a fastener 201 engaged in and extending through the engaging hole 401. One end of the fastener 201 is fixed to the rotatable disk 40, the other end of the fastener 201 is fixedly engaged with the second rotatable shaft 311, such that the second rotatable shaft 311 drives the fastener 201 together with the rotatable disk 40 to rotate.

It is understood that the fastener 201 can be integrally formed with the rotatable disk 40, that is, the engaging hole 401 can be omitted.

The rotatable disk 40 further has two first receiving holes 402a and two second receiving holes 402b defined through the rotatable disk 40. The first receiving holes 402a and the second receiving holes 402b are equally spaced in an imaginary circle, and the first receiving holes 402a are arranged in a first line, the second receiving holes 402b are arranged in a second line perpendicular to the first line. During operation, in alternating fashion, the first receiving holes 402a align with the second accommodating holes 102, respectively; then the second receiving holes 402b align with the second accommodating holes 102, respectively.

In application, when the first receiving holes 402a or the second receiving holes 402b are aligned with the second accommodating holes 102, the part delivering devices 20 are initiated and each deliver a part 200 into the corresponding first receiving hole 402*a*. Then the rotatable disk driving device 30 is initiated and the rotatable disk 40 is rotated to move the first receiving holes 402*a* to another position, and the second receiving holes 402*b* can be moved to align with the second accommodating holes 102. At this time, a suction device (not shown) can be used to suck the part 200 from the first receiving holes 402*a* to mount it to a product.

The alternation of the first receiving holes 402*a* and the second receiving holes 402*b* ensures a continuous supply of the parts in a factory line. If a higher speed of the part supplying is required, the number of the receiving holes of the rotatable disk 40 can be increased.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. An automatic part feeder, comprising:
   a base comprising a first end surface, an opposite second end surface, one first accommodating hole and a plurality of second accommodating holes, the first and second accommodating holes being separated from each other and each being exposed at the first end surface;
   a plurality of part delivering devices accommodated in the respective second accommodating holes, each of the part delivering devices comprising a ring-shaped receiving room opening toward the first end surface, a first driving motor having a first rotatable shaft, and an ejector pole having one end extending through the ring-shaped receiving room and another end threadedly engaged with the first rotatable shaft, the ring-shaped receiving room configured for receiving a plurality of parts, the ejector pole being movable outwardly by means of rotation of the first rotatable shaft, thereby ejecting the parts out of the ring-shaped receiving room;
   a rotatable disk driving device accommodated in the first accommodating hole, the rotatable disk driving device having a second driving motor having a second rotatable shaft; and
   a rotatable disk covering the first end surface, the rotatable disk comprising a plurality of first receiving holes and a plurality of second receiving holes, the second rotatable shaft engaged with the rotatable disk and configured for driving the rotatable disk to rotate between a first position where the first receiving holes are aligned with the respective ring-shaped receiving rooms thus allowing the parts to be ejected from the ring-shaped receiving rooms, and at a second position where the second receiving holes are aligned with the respective ring-shaped receiving rooms thus allowing the parts to be ejected from the ring-shaped receiving rooms.

2. The automatic part feeder of claim 1, wherein the rotatable disk comprises an engaging hole, and a fastener extending through the engaging hole, the fastener fixedly engaged with the second rotatable shaft.

3. The automatic part feeder of claim 1, wherein the rotatable disk comprises a fastener protruding from a bottom surface of the rotatable disk, the fastener fixedly engaged with the second rotatable shaft.

4. The automatic part feeder of claim 1, wherein the first and second accommodating holes are exposed at both of the first and second end surfaces, and the second accommodating holes are symmetrical about the first accommodating hole.

5. The automatic part feeder of claim 1, wherein the first and second motors are fixed to the base.

6. The automatic part feeder of claim 1, wherein each of the part delivering devices comprises a part support received in the corresponding second accommodating hole and fixed to the base, and the ring-shaped receiving room is formed in the part support.

7. The automatic part feeder of claim 6, wherein a bottom of the ring-shaped receiving room has two sliding holes formed through the ring-shaped receiving room, the ejector pole comprises two ejector posts extending through the sliding holes for abutting on the parts.

8. The automatic part feeder of claim 7, wherein the ejector pole further comprises a hollow cylindrical portion having an inner thread formed in an inner wall of the cylindrical portion, the first rotatable shaft having outer thread formed in an outer wall of the first rotatable shaft, threadedly engaging with the cylindrical portion.

* * * * *